United States Patent [19]

Tisue et al.

[11] Patent Number: 4,573,076
[45] Date of Patent: Feb. 25, 1986

[54] IMAGE SENSOR INCLUDING A REPEATING READ FUNCTION

[75] Inventors: Gil Tisue, Los Altos, Calif.; Ryuji Kondo, Kanagawa, Japan

[73] Assignee: Fuji Photo Film Co., Ltd., Kanagawa, Japan

[21] Appl. No.: 630,601

[22] Filed: Jul. 13, 1984

[51] Int. Cl.[4] ............................................. H04N 3/12
[52] U.S. Cl. ...................................... 358/212; 357/24
[58] Field of Search ...................... 358/213, 209, 212; 250/578; 357/24 LR

[56] References Cited

U.S. PATENT DOCUMENTS

| | | | |
|---|---|---|---|
| 3,872,245 | 3/1975 | Sagawa et al. | 358/213 |
| 3,934,161 | 1/1976 | Caywood | 358/213 |
| 4,335,405 | 6/1982 | Sakane et al. | 358/213 |
| 4,415,937 | 11/1983 | Nishizawa et al. | 358/213 |
| 4,524,391 | 6/1985 | Nishizawa et al. | 357/213 |
| 4,528,595 | 7/1985 | Eouzan | 358/213 |
| 4,531,156 | 7/1985 | Nishizawa et al. | 358/213 |

Primary Examiner—Gene Z. Rubinson
Assistant Examiner—Stephen Brinich
Attorney, Agent, or Firm—Sughrue, Mion, Zinn, Macpeak & Seas

[57] ABSTRACT

An image sensor device of the pixel array type is operated such that each array element receives a pair of read-out signals in close time succession corresponding to an exposure time. The first and second read-out signals are applied to subsequent rows of array elements in an overlapped fashion, and logic circuitry is employed to permit only the second read-out values to be stored in a memory.

3 Claims, 4 Drawing Figures

IMAGE SENSOR INCLUDING A REPEATING READ FUNCTION

BACKGROUND OF THE INVENTION

The invention pertains generally to a solid-state image sensing device. More particularly, the invention pertains to a solid-state imaging device particularly adapted for use in an electronic still camera.

FIG. 1 illustrates a conventional image sensing device of the same general type to which the invention pertains. Pixel array 12 is formed as a matrix of individual light-sensing pixels (picture elements) arranged in rows and columns. Charges are stored in each of the pixels in a magnitude related to the intensity of the light striking the element subsequent to the last time the charge on the element was reset. More specifically, first a capacitor in each pixel is charged to a predetermined level, and then the array is exposed to image light for a predetermined duration. During the exposure time, the charge initially stored in each of the pixels is depleted in an amount which increases with the intensity of the light striking the pixel during the exposure time.

Following exposure, the output lines from a vertical shift register 11 are actuated in sequence to read out the charges stored in the pixel array 12 row by row. Particularly, a first output line 16 of the vertical shift register 11 is first activated by applying a pulse thereto. Following the activation of the line 16, a horizontal shift register 14 is operated to read out, via an output switch 13, the charges extracted from the row of the pixel array 12 actuated by the line 16. The next output line of the vertical shift register 11 is actuated, and the horizontal shift register 14 is cycled again to read out a subsequent row of the pixel array 12. This process is continued until the last output line 17 of the vertical shift register 11 has been actuated, at which time the charges of all of the pixels of the pixel array 12 have been read out, via the output switch 13, in serial order, onto a video output line 18.

FIG. 2 is a waveform diagram showing the application of the pulses from the vertical shift register 11 to the pixel array 12. As mentioned above, it is necessary to reset the pixel array 12 to a predetermined, uniform state prior to exposure. Were this not done, charges accumulated prior to exposure, such as may be due to a dark current, would interfere with the levels effected in response to the next exposure operation, hence leading to a distorted output. To reset the pixel array, it has been the practice to scan the pixel array 12 once or twice in the pattern indicated in FIG. 2 prior to exposure. However, the total time required to scan the array is long relative to typical exposure times. Hence, in a still camera, there is an appreciable delay between the time the shutter button is depressed and the time when the actual exposure is performed.

Further, because in the presence of a bright image the picture elements of the array 12 might otherwise saturate due to the fixed read-out time employed by the conventional arrangement, it was necessary to provide a mechanical shutter to control the amount of light striking the pixel array 12.

Accordingly, it is an object of the present invention to provide an image sensor and a method for operating an image sensor in which the above-mentioned drawbacks have been eliminated.

SUMMARY OF THE INVENTION

These, as well as other objects of the invention, have been met by a method for reading out a pixel array including the steps of applying to each vertical line of the array, in sequence, two closely time-successive activating pulses, and storing information read out from the array in response to only the second ones of the activating pulses. Preferably, the intensity of image light, or at least an approximation thereof, is sensed, and the time duration between each two successive activating pulses on each of the vertical lines is varied in accordance with the sensed intensity. The term "closely time successive" as used herein refers to a time period which is short in comparison with the total time required to read out the entire pixel array.

Further, the objects of the invention are met by an image sensing device including a pixel array having a plurality of vertical input lines for supplying reading pulses to the array and a plurality of horizontal output lines coupled to each picture element position in each row of the array, a horizontal shift register, an output switch having control inputs coupled to outputs of the horizontal shift register and data inputs coupled to the horizontal lines of the array, for successively coupling the horizontal lines to an output terminal one at a time in response to pulses from the horizontal shift register, first and second vertical shift registers, both the first vertical shift register and the second vertical shift register having outputs coupled to each of the vertical lines of the array, and means for alternatingly actuating the first and second shift registers to shift pulses therethrough through a predetermined number of stages. The operation of the actuating means is started upon the depression of a shutter button of the camera. Further, the actuating means responds to the intensity of image light to vary the predetermined timing of the pulses to effectively set an exposure time of the array. To do this, the actuating means may include a light sensor which produces a signal having a magnitude which varies in accordance with the light intensity of the sensed image, an analog-to-digital converter for converting the output signal from the sensor to a digital value, a counter, a digital comparator for comparing a digital output of said analog-to-digital converter with an output of said counter and for producing a pulse on an output thereof when the outputs of the analog-to-digital converter and counter are equal, and a switching circuit for changing the connection of a clock signal between the first vertical shift register and second vertical shift register each time a pulse is produced on the output of the comparator. Further, the device may include a second analog-to-digital converter for converting to digital form the output signal produced on the output of the output switch, a frame memory for storing the digital outputs produced by the second analog-to-digital converter, an address counter for addressing the frame memory, and a second switch means for applying clock pulses to the address counter to store data from the pixel array therein only for data read out from the array in response to the second pulse applied to each vertical line of array.

DESCRIPTION OF THE PREFERRED EMBODIMENTS

In accordance with one important aspect of the invention, each vertical line of the pixel array 12 is actuated twice in close time succession. The first actuation clears the line, while the second is used for the actual read-out operation. By varying the time period between the two actuations of each line, an effective exposure time is determined. This eliminates the need for a mechanical shutter.

Figure 3:
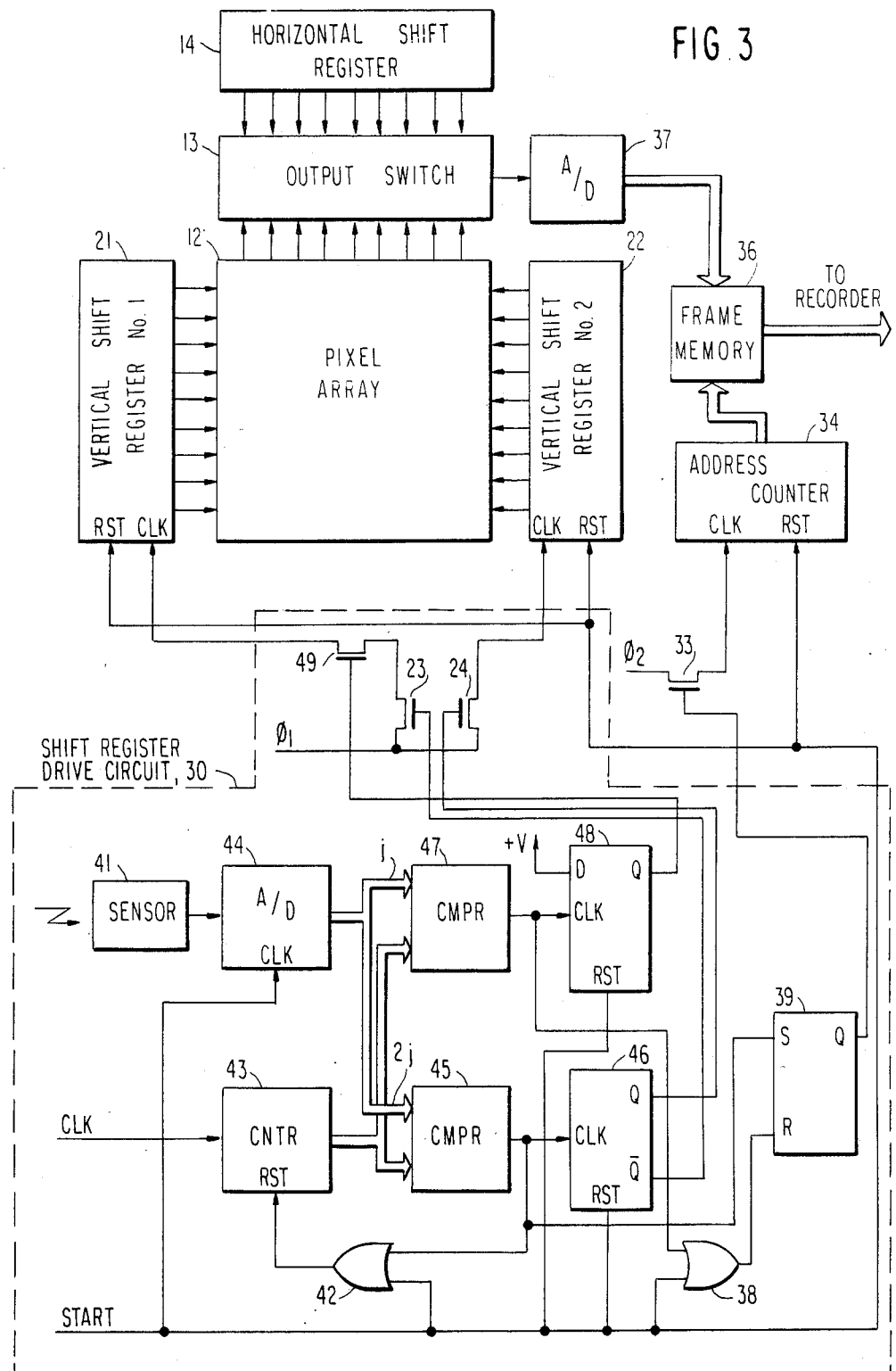
FIG. 3 is a block diagram of an image sensor constructed in accordance with the present invention.

The invention will now be described in more detail with reference to the block diagram of FIG. 3 showing a preferred embodiment of an image sensor device constructed in accordance with the present invention.

Figure 1:
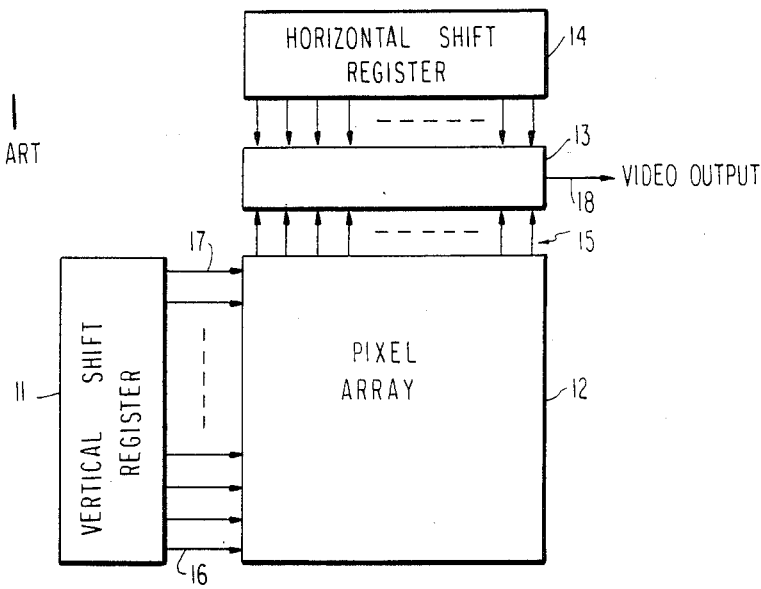
FIG. 1 shows a block diagram of a conventional image sensor circuit of the same general type to which the invention pertains.
Figure 2:
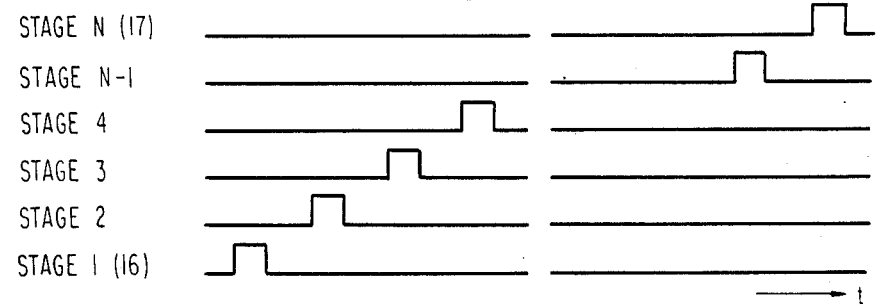
FIG. 2 is a timing diagram showing actuating pulses applied to vertical lines of a pixel array of the device shown in FIG. 1.

A pixel array 12, output switch 13 and horizontal shift register 14 are provided having the same construction and configuration as in the conventional arrangement of FIG. 1. In accordance with the invention, two vertical shift registers 21 and 22 are provided. The output lines from the vertical shift registers 21 and 22 are both coupled to like-ordered ones of the vertical lines of the pixel array 12. That is, the i-th outputs from both the shift registers 21 and 22 are coupled to the i-th vertical line of the pixel array 12. (The term "vertical" is so used to indicate the direction in which these lines are scanned, rather than the direction in which they physically extend.)

A shift register drive circuit 30 is provided to control the operations of the shift registers 21 and 22. The shift register drive circuit 30 includes a light-intensity sensor 41, the output of which is applied to an analog-to-digital converter 44 for conversion to digital form. The arrangement of the sensor 41 is such that the output voltage thereof decreases with increasing image light intensity. The digital output of the analog-to-digital converter 44 is applied to one input port of a comparator 45, the other input port of which receives the digital output of a binary counter 43. The counter 43 is reset by a pulse signal START generated when the shutter button is depressed, and also each time a pulse is generated at the output of the comparator 45 indicating that the outputs from the analog-to-digital converter 44 and the counter 43 are identical. To effect this operation, the output of the comparator 45 is logically ORed with the START signal using an OR gate 42. The output of the comparator 45 is applied to a toggle-type flip-flop 46, the reset input of which also receives the START signal. The Q and $\bar{Q}$ outputs of the flip-flop 46 are applied to control gates of respective FET switches 23 and 24, the sources of which receive a first clock signal $\phi_1$. The drains of the FET switches 23 and 24 are connected to clock terminals of the shift registers 21 and 22, respectively (Via an FET switch 49 in the case of switch 23).

A second comparator 47 also receives the output of the counter 43 of a first input port thereof. The second input port of the comparator 47 receives the output of the analog-to-digital converter 44; however, the output lines are shifted downward by one position in their connection so that the second input port of the comparator 47 effectively receives a value of j. The output of the comparator 47 is coupled to a clock input of a D-type flip-flop 48, the D input of which is connected to a voltage corresponding to the logical "1" state. A reset input of the flip-flop receives the START signal. The Q output of the flip-flop 48 is coupled to the control gate of an FET switch 49 having a controlled current path (source-drain) coupled in series with that of the FET switch 23.

The S (set) input of an R-S flip-flop 39 receives the output of the comparator 45, while the R (reset) input thereof receives, via an OR gate 38, the output of the comparator 47 and the START signal. The Q output of the flip-flop 39 is coupled to the gate of an FET switch 33, the source of which receives a clock signal $\phi_2$. The drain of the FET switch 33 is applied to the clock input of an address counter 34, the reset input of which is connected to the START signal line.

After being converted to digital form by the analog-to-digital converter 37, the video output signal produced at the output terminal of the output switch 13, having instantaneous values corresponding to the outputs of respective ones of the pixels, is applied to the data input of a frame memory 36. The addresses at which the video signal samples from the analog-to-digital converter 37 are stored in the frame memory 36 are supplied from the address counter 34. The output of the frame memory 36 may be applied, for instance, to a data recorder for later display.

In operation, when the shutter button of the camera is depressed, the counter 43, the flip-flops 46, 48, the vertical shift registers 21 and 22, and the address counter 34 are reset to initial states via the START signal, as shown in FIG. 3. Specifically, the counter 43 is reset to zero, the $\bar{Q}$ output of the flip-flop 46 is in the "1" state, the vertical shift registers 21 and 22 are set in a state such that a "1" is present on an output line just prior to the lowest-order output line connected to a vertical line of the pixel array 12, and the address counter 34 is reset to zero. In the case of the shift registers 21, 22, a true "reset" frunction is not actually effected as it is not possible in general to merely clear such registers after data has been shifted therein. In general, the resetting of the registers 21, 22 may be effected by ensuring that a sufficient number of clock pulses are applied thereto at the end of a preceeding cycle to "empty" the registers. At the start time, a "1" is loaded in the manner indicated above. A digital value 2j is then outputted by the analog-to-digital converter 44 upon being clocked by the START signal.

In this state, the FET switch 23 is turned on. However, because no pulse has as yet been outputted by the comparator 47 since the count value of the output of the counter 43 is still less than j, the flip-flop 48 remains in the reset state, thereby turning off the FET switch 49 and hence preventing clock pulses from being applied to the clock input of the vertical shift register 21. When the digital output value from the counter 43 reaches j, the comparator 47 produces a pulse which clocks the flip-flop 48, thereby applying a "1" to the control gate of the FET switch 49 and thus enabling the application of (j) clock pulses $\phi_1$ to the input of vertical shift register 21. The FET switch 49 remains in the on state throughout the entire scanning operation, that is, until the shutter is again depressed and the pulse signal START is generated.

When the output of the counter reaches the value 2j, the comparator 45 outputs a pulse which toggles the flip-flop 46 and resets the counter via the OR gate 42.

This also has the effect of turning off the FET switch 23 and turning on the FET switch 24 to allow the application of clock pulses to the shift register 22. The vertical shift register 22 then shifts a pulse in sequence along its output lines through 2j stages. When a pulse reaches the 2j-th stage of the shift register 22, that is, when the comparator 45 again produces an output pulse upon the counter 43 reaching a count of 2j, the counter 43 is reset, the FET switch 24 is turned off and the FET switch 23 is again turned on, to thereby shift pulses from the stage j+1 of the shift register 21, the stage following that at which the shifting was halted in the initial shifting operation, to the j+2j stage. This scanning operation continues until all vertical lines of the pixel array 12 have received two pulses.

When the vertical lines of the pixel array 12 are receiving their second pulses, which occur in the first half of each shifting sequence of each of the two shift registers, the Q output of the R-S flip-flop 39 is at "1" because the flip-flop 39 is set by the output of the comparator 45, and thus the FET switch 33 is turned on to enable the application of clock pulses $\phi_2$ to the address counter 34. For the second half of each shifting sequence of each of the two shift registers, the Q output of the flip-flop 39 is a "0" because the flip-flop 39 is reset by the comparator 47, via the OR gate 38, when a count of j is reached. In this case, the FET switch 33 is turned off to inhibit the application of clock pulses $\phi_2$ to the address counter 34. Hence, the address counter 34 supplies advancing addresses to the frame memory 36 only for the second reading out of each vertical line of the pixel array 12. The data read out in response to the first scanning pulse on each vertical line (those applied from the first vertical shift register 21) represent only dark current and undesired exposure values, and these are discarded (for example by subsequent writing thereover). The video signal values read out in response to the second pulses applied to each of the vertical lines of the pixel array 12 and which represent the actual image, are stored in the frame memory 36.

Figure 4:
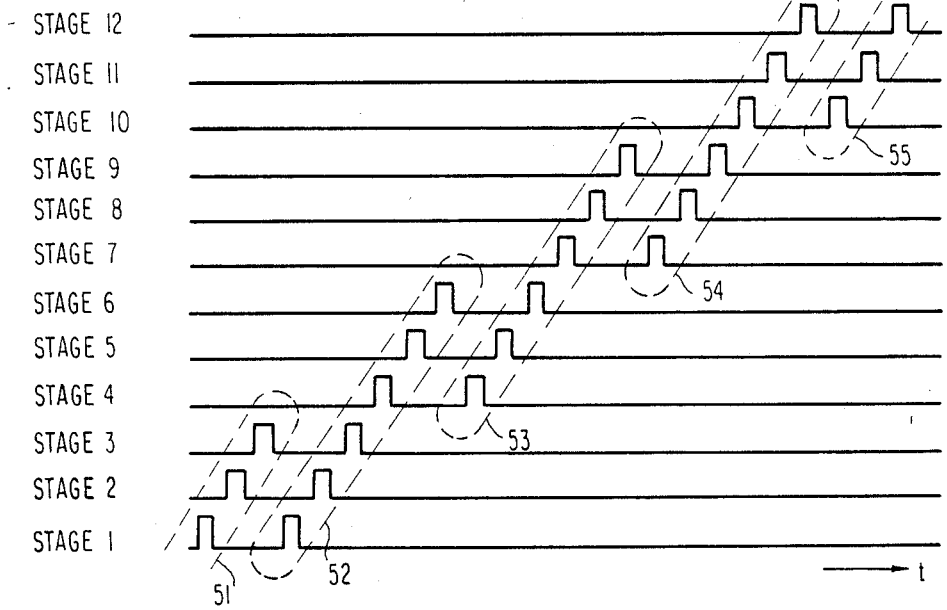
FIG. 4 is a timing chart showing the application of vertical pulses to the pixel array of the device of FIG. 3.

The pulse pattern produced in this scanning operation is indicated in FIG. 4. Here, it is assumed that 2j=6. Stages 1 through 3 are first scanned with a sequence of pulses 51 provided by the first vertical shift register 21 immediately after the flip-flop 48 turns on the FET switch 49. Stages 1 through 6 are then scanned by the second vertical shift register 22 in a sequence of pulses 52. Following this, stages 4 through 9 are scanned by a sequence of pulses 53 provided by the first vertical shift register 21. This same scanning pattern is repeated sequentially with pulse sequences 54, 55, etc. until all vertical lines of the pixel array 12 have received two scanning pulses.

When the intensity of light changes, the value of 2j will change. Specifically, as the intensity of light increases, the value of 2j decreases since the output voltage of the sensor 41 decreases in response to an increase in the received light intensity. In such a case, the two pulses on any one vertical line of the pixel array 12 will be moved closer together in time. Since the time between the two pulses on each of the lines determines an effective exposure time, it can readily be appreciated that the exposure time is varied in accordance with the sensed light intensity. Hence, using the invention, no mechanical shutter is required.

This completes the description of the preferred embodiments of the invention. Although preferred embodiments have been described, it is believed that numerous modifications and alterations thereto would be apparent to one of ordinary skill in the art without departing from the spirit and scope of the invention.

We claim:

1. A method of reading out a pixel array having N vertical lines, comprising the steps of:
    (a) sequentially applying activating pulses to a first set of said vertical lines;
    (b) sequentially applying activating pulses to a second set of said vertical lines, wherein said second set of vertical lines at least partially overlaps said first set of vertical lines;
    (c) repetitively repeating steps (a) and (b), with subsequent first and second sets of vertical lines respectively containing higher ordered vertical lines until the Nth vertical line has received two activating pulses.

2. The method of reading out a pixel array as claimed in claim 1, further comprising the step of:
    (d) sensing the intensity of incident light; and
    (e) varying the number of vertical lines in said first and second sets in accordance with the sensed light intensity whereby said number is increased as said sensed intensity decreases and said number is decreased as said sensed intensity increases.

3. The method of reading out a pixel array of claim 1, wherein subsequent first sets of said vertical lines partially overlap said second sets of vertical lines in the same manner that said second sets partially overlap said first sets.

* * * * *